Nov. 22, 1927. 1,650,060
R. BOSSELMANN
DIFFERENTIAL PRESSURE METER
Filed July 22, 1925 2 Sheets-Sheet 2

Inventor
Richard Bosselmann
by Henry Orth Jr
Atty

Patented Nov. 22, 1927.

1,650,060

UNITED STATES PATENT OFFICE.

RICHARD BOSSELMANN, OF BERLIN, GERMANY.

DIFFERENTIAL-PRESSURE METER.

Application filed July 22, 1925, Serial No. 45,359, and in Germany August 1, 1924.

In order to determine the differential pressure of a medium, and in particular the quantity passing of flowing gases and liquids, there is mostly employed a membrane subject to pressure from both sides, which membrane is connected by a lever and toothed gearing with an indicating mechanism or pointer. This method of measurement does not present any difficulties in measuring pressures slightly above or slightly below atmospheric. With high pressures, however, in order that the transmission devices from one or both sides may be carried to the outside exceptionally good stuffing boxes are used which effect the exactitude of measurement. Such exactitude is also reduced by the employment of strong membranes due to their small elasticity and consequently due to the greater transmission ratio for actuating the pointer required thereby.

In the differential pressure meter forming the subject of the present invention and employing two measuring chambers, these disadvantages are avoided by the use of two membranes shutting off and arranged between the measuring chambers which membranes are mutually supported by a large number of rigid members distributed over their surface. Very weak and therefore highly sensitive membranes may consequently be used, and these membranes since they support one another are protected from deformation.

Moreover, the combination of the membranes permits of freely mounting the lever, operated by the membranes and transmitting motion to the indicating mechanism without the need for stuffing boxes in the casing containing the measuring chambers and membranes.

Figure 1:
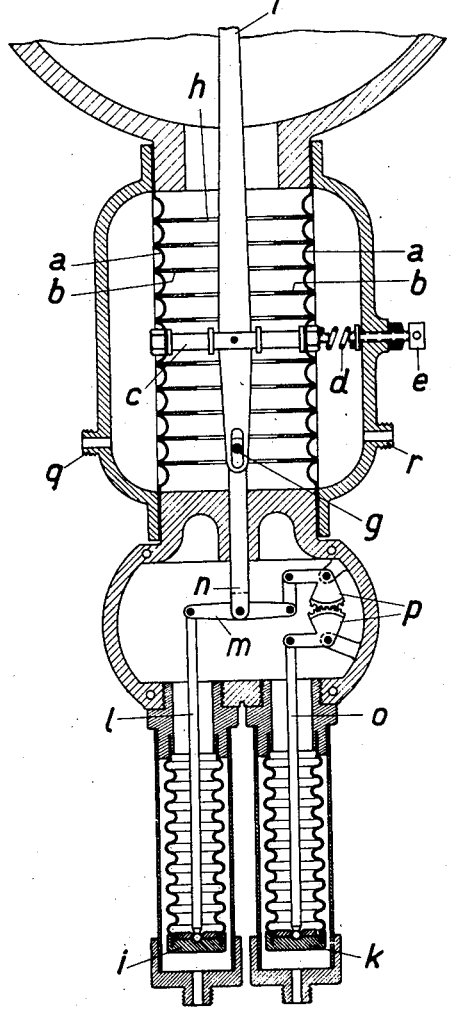
Figure 2:
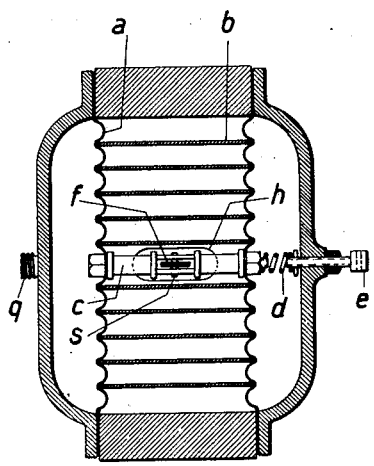
Figure 3:
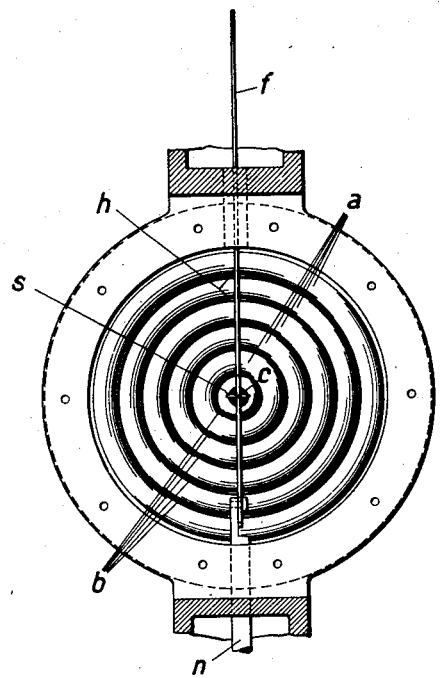

The improved differential pressure meter is illustrated in the accompanying drawings by way of example, in which Figure 1 is a vertical section; Fig. 2 is a transverse central section through the main operating unit; Fig. 3, is a view looking at the side of the main unit, the cover being removed.

As shown, within the pressure meter casing are mounted parallel to one another two very weak membranes $a$, here shown as having circular corrugations shutting off the pressure chambers and enclosing a chamber communicating freely with the atmosphere. The surfaces of the two membranes which face one another are sub-divided by a large number of concentrically arranged rigid cylindrical rings $b$ which support both membranes from one another and form a piston-like body. Both membranes $a$ are, moreover, connected at the center to a rigid rod $c$. On this rod acts a spring $d$ which may be given various tensions by means of an adjusting screw $e$. It is thus possible to impart to the membranes $a$ an initial stress, i. e., subject them to a pressure acting in an opposite direction to that in which they move when in operation, whereby the movement of the membranes $a$ is increased.

Midway of the rod $c$ engages a lever $f$ adapted to pivot about a pivot $g$, which rod transmits the movement of the membranes $a$ in operation to the indicating mechanism of the differential pressure meter.

In order that the lever $f$ pivotally mounted at $s$ on rod $c$ within the intermediate space, which is not subjected to pressure may project externally of the pressure meter casing, without the need for stuffing boxes, the rigid supporting rings $b$ are provided with suitable slots $h$. The pivot $g$ may be fixed or, as shown in the example illustrated, may be adjustable. Such adjustability is of importance when the differential pressure meter is intended to be used for the volumetric measurement of superheated steam subject to great variations in pressure. The displacement of the pivot $g$ is effected by the two elastic pistons $i$ and $k$, of which the first is under the influence of the pressure and the second under the influence of the temperature of the medium to be measured (steam, water or gas). While the rod $l$ of the piston $i$ directly engages the double-armed lever $m$ of the pivot support $n$, there is interposed between the rod $o$ of the piston $k$ and the double-armed lever $m$ two toothed segments $p$. $q$ and $r$ indicate the connections for the pressure pipes leading to the two pressure chambers of the meter casing, which pipes for example are connected in front and behind the section to be measured of the flow meter.

In operation, if, for example, the pressure on the membrane $a$, shown to the left in the drawing, is greater than the pressure on the opposite membrane, so that the two membranes flex towards the right, the lever $f$ is bodily moved and thereby caused to swing about its pivot $g$. The lever $f$ may serve to operate a stylograph or like mechanism, recording the quantity of medium flowing through the pipe. If the pressure in the steam pipe varies, the piston $i$ and thus the pivot $g$ is displaced. The pivot $g$ is also displaced when the temperature of the steam rises or falls. With increase of pressure the pivot $g$ moves towards the points at which the lever $f$ is pivoted on the rod $c$. With a rise in temperature the distance between this pivot and the pivot $g$ is increased. Pressure and temperature variations may in this manner be balanced.

I claim—

1. A pressure meter comprising a casing, a pair of corrugated diaphragms dividing the casing into two separate pressure chambers with the space between the diaphragms open to atmospheric pressure, concentric cylindrical rings between and mutually supporting the diaphragms and having openings therethrough, and an indicator hand passing through the openings and arranged to be moved from said diaphragms.

2. In a differential pressure indicator, a casing, a pair of spaced diaphragms in the casing, a rigid member connecting the diaphragms, an indicator lever pivoted on said member and provided with a slot, said lever bodily movable with said member and diaphragms, a pin engaging said slot and movable in a straight line in the slot, pressure responsive means and temperature responsive means connected to said pin to shift said pin in said slot in accordance with the algebraic sum of the pressure and temperature effects.

3. A differential pressure meter including a casing, having two measuring chambers therein, two membranes each serving as a closure for one of said measuring chambers, spaced rigid supports extending between said membranes, said supports consisting of co-axial cylinders, said cylinders formed with slots, a rod connecting the axes of said membranes, an indicating lever pivotally supported on said connecting rod and extending through said slots, and means for effecting pivotal movement of said lever about said pivot.

4. A differential pressure meter including a casing, having two measuring chambers therein, two membranes each serving as a closure for one of said measuring chambers, spaced rigid supports extending between said membranes, said supports consisting of co-axial cylinders, said cylinders formed with slots, a rod connecting the axes of said membranes, an indicating lever pivotally supported on said connecting rod and extending through said slots, and means for effecting pivotal movement of said lever about said pivot, said means including an adjustable connection providing for variation of the point of application of pivotal movement to said lever.

5. A differential pressure meter including a casing, having two measuring chambers therein, two membranes each serving as a closure for one of said measuring chambers, spaced rigid supports extending between said membranes, said supports consisting of rigid co-axial cylinders, said cylinders formed with slots, a rod connecting the axes of said membranes, an indicating lever pivotally supported on said connecting rod and extending through the slots in said disks, means for effecting pivotal movement of said indicating lever, said means including a pin and slot connection between said lever and the indicating mechanism, and means for displacing one member of the said pin and slot connection, said second-mentioned means including two cylinders, two pistons and a rod displaceable in dependence on temperature and pressure conditions within said cylinders.

6. A differential pressure meter including a casing, having two measuring chambers therein, two membranes each serving as a closure for one of said measuring chambers, spaced rigid supports extending at intervals between said membranes, a rod connecting the axes of said membranes, an indicating lever pivotally supported on said connecting rod, and means for applying initial stress to said membranes.

7. A differential pressure meter comprising a casing, a pair of spaced corrugated diaphragms dividing the casing into two separate pressure chambers with the space between said diaphragms open to atmospheric pressure, concentric cylindrical rings between and mutually supporting the diaphragms at the corrugations, and having openings therethrough, an indicator hand passing through said openings and means to adjustably stress the structure consisting of the diaphragms and rings.

8. A differential pressure meter comprising a casing, a pair of spaced, circularly corrugated, diaphragms whose interspace is at atmospheric pressure dividing the casing into pressure chambers; cylindrical apertured rings between and mutually supporting the diaphragms at the corrugations, a central rod connecting the diaphragms, an indicator pivoted to said rod between the diaphragms, a second rod, a pin and slot connection between said second rod and the indicator, means to operate said second rod by the algebraic sum of pressure and temperature effects.

9. In a differential pressure meter, a pair of spaced, circularly corrugated diaphragms, whose interspace is at atmospheric pressure and said diaphragms dividing the casing into two pressure chambers; cylindrical, apertured rings between and supporting the diaphragms at the corrugations, a rigid member connecting the diaphragms, an indicator lever pivoted on said member, passing through the apertures of the rings and having a slot in one end, a pivot support movably mounted in the casing, a pressure cylinder on said casing, a piston therein connected to said support, a thermostatic element mounted on said casing and also connected to said support, said pressure piston and thermostatic element arranged to transmit their effects to said support in opposite directions.

In testimony that I claim the foregoing as my invention, I have signed my name.

RICHARD BOSSELMANN.